United States Patent Office 3,471,444
Patented Oct. 7, 1969

---

3,471,444
POLYAMIDE-IMIDES AND PRECURSORS THEREOF
Thomas L. Sherer, Richmond, and Ralph G. Flowers, Pittsfield, Mass., assignors to General Electric Company, a corporation of New York
No Drawing. Filed Feb. 23, 1966, Ser. No. 529,240
Int. Cl. C08g *20/32;* C07c *103/44*
U.S. Cl. 260—65                                5 Claims

ABSTRACT OF THE DISCLOSURE

New and useful polyamide-imides and their precursor polyamic acids and polyamide-diamines are provided. The polyamic diamine is prepared by reacting an aliphatic dibasic acid with an aromatic diamine, the polyamic acid is prepared by reacting the polyamide-diamine with a tetravalent dianhydride and the polyamide-imide is prepared by curing the polyamide-amide acid.

---

This invention relates to new and useful compositions of matter. More particularly, it relates to new and useful polyamide-imides, to their precursor polyamic acids and to intermediates useful for the preparation of such compositions.

The preparation of polyamide-acids by the reaction under suitable conditions and using compatible solvents of aromatic diamines and aromatic dianhydrides is well known as described, for example, in Patents 3,179,614; 3,179,634 and 3,190,856. The preparation of polyamide-modified polyimides containing aromatic groups is also well known as set forth, for example, in Patent 3,179,635. While such materials are possessed of salutary physical and electrical properties, they are not without their drawbacks. The highly aromatic nature of such materials generally requires the use of relatively expensive solvents such as N,N-dimethyl formamide, N-methyl-2-pyrrolidone, N,N-dimethyl acetamide and the like. Further, such materials taken as a group are rather difficult to obtain, without the use of special equipment, in the form of films or coatings as on electrical conductors. Heavy builds adequate for generally required electrical insulating purposes are usually subject to dislocations and powdering. Finally, a rather specialized cure cycle is required to obtain polymer coatings of such materials from these solutions.

It has now been unexpectedly found that polyamide-acids and resulting polyimides of superior characteristics including flexibility, toughness and good electrical properties are obtainable from specific precursors which are additionally soluble in such easily obtainable and inexpensive solvents as cresol, and a principal object of this invention is to provide such materials.

Briefly, the present invention relates to novel polyamide-diamines and polyamide amide-acids and polyamide to imides prepared therefrom. The polyamide-diamine is prepared by reacting at least one dibasic acid having the formula (I)        HOOC—R'—COOH where R' is an unsaturated or saturated aliphatic group containing from about 1 to 40 carbon atoms with at least one aromatic diamine having the formula (II)        H₂N—R''—NH₂ where R'' is a divalent aromatic group, the free valences being on or the two amino radicals being attached to separate carbon atoms of the divalent group.

Among the aliphatic dibasic acids which may be utilized are oxalic, maleic, succinic, glutaric, adipic, pimelic, suberic, azelaic, sebacic and dodecanedioic acids, as well as unsaturated acids falling within the above formula including maleic and fumaric acids, among others.

A dibasic acid having a chain thirty-six carbons long is Emery Industries, Inc. 3713–R Dimer Acid. Others will occur to those skilled in the art.

Among the diamines which may be used are those listed in Patent 3,179,614 and elsewhere, including benzidine, 4,4'-diaminodiphenyl ether, 3,3'-dimethoxy-4,4'-diaminodiphenyl methane, meta-phenylenediamine, para-phenylenediamine, and others.

In preparing the polyamide-diamine, dibasic acid is reacted with diamine, which latter is about one mole in excess, in a cresol solution to form about a 50% by weight solution. Typically, the reactant mixture is refluxed with stirring for about 1½ to 7 hours with distillation of water from the mixture. When the formation of the polyamide-diamine is complete, the reaction mixture is diluted to about 25% solids with cresol and cooled to about 100° C. Dianhydride is then added in cresol solution to the reaction mixture and reacted for about 10 minutes at about 100° C. to produce the polyamide amide-acid which can be further converted as by heat to the imide stage. A particular advantage of the present process, it will be seen, is that it can be a pseudo one-step preparation.

The polyamide-diamine of the present invention may be expressed by the formula (III) 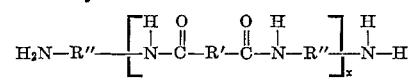

wherein R' is a saturated or unsaturated aliphatic hydrocarbon group or straight chain hydrocarbon radical containing from about 1 to 40 carbon atoms, R'' is an aromatic group, such as phenylene, diphenylene, diphenylene ether, diphenylene ketone, etc., substituted or unsubstituted, and *x* varies from about 1 to 3. Generally speaking, increasing *x* above 3 produces increasingly brittle final polymers which, while useful for some purposes, do not provide flexible, tough films and coating materials. However, the diamine itself may be of any length as such.

In preparing the polyamide amide-acid, the amine-terminated polyamide is reacted in essentially equimolar amounts with a dianhydride having the formula (IV) 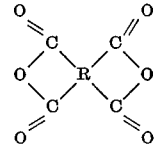

wherein R is a tetravalent organic radical containing at least two carbon atoms selected from substituted and unsubstituted aliphatic, cycloaliphatic, heterocyclic, aromatic and combinations of such groups. Among the anhydrides useful in this connection are pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl)propane dianhydride bis(3,4 - dicarboxyphenyl)sulfone dianhydride, perylene 3,4,9,10-tetracarboxylic acid dianhydride, bis(3,4-dicarboxyphenyl) ether dianhydride, naphthalene-1,2,4,5-tetracarboxylic dianhydride, 2,2-bis(2,3-dicarboxyphenyl)propane dianhydride, 1,1-bis(2,3-dicarboxyphenyl) ethane dianhydride, 1,1-bis(3,4-dicarboxyphenyl) ethane dianhydride, bis(2,3-dicarboxyphenyl) methane dianhydride, bis(3,4-dicarboxyphenyl) methane dianhydride, benzene-1,2,3,4-tetracarboxylic dianhydride, pyrazine-2,3,5,6-tetracarboxylic dianhydride, thiophene-2,3,4,5 - tetracarboxylic dianhydride, 3,4,3',4'-benzophenone tetracarboxylic dianhydride, etc.

The reaction between the dianhydride and polyamide-diamine is generally carried out by dissolving the anhydride in enough cresol to produce a solid content of about 20% by weight, adding to the polyamide-amine and reacting for about ten minutes at 100° C., cooling to about 40–50° C. and removing from the reaction kettle, the final product being a polyamide amide-acid having the general formula (V)

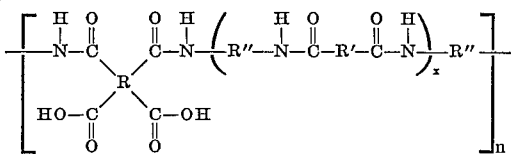

where R, R', R" and x are as above and n is at least 2. When heated at a temperature of about 250° C. or higher for times ranging from about 5 minutes upward, the polyamide amide-acid is converted to an amide-imide having the formula (VI)

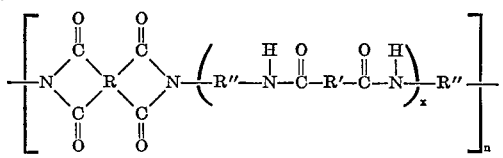

where the various constituents are as above. The following examples will illustrate the practice of the invention, it being realized that they are to be taken as exemplary only.

Example 1

There were placed in a reaction flask equipped with stirrer, Dean-Stark trap, condenser, heating mantle and nitrogen purge system 7.22 g. (.0365 mole) p,p'-diaminodiphenyl methane, 3.46 g. (.0182 mole) azelaic acid and 10 g. of cresol, the mixture being stirred and heated at reflux (205°–220° C.) under nitrogen for about 4 hours, during which time about 0.5 cc. of water passed into the trap. The reaction mixture was then diluted with 26 g. of cresol having a moisture content of less than about 100 p.p.m. of water and cooled to 90° C. This represents the preparation of the polyamide-amine intermediates of the invention. To the above solution was added a solution containing 5.8 g. (.018 mole) of 3,3',4,4' - benzophenone tetracarboxylic dianhydride (benzophenone dianhydride) in 46 g. of cresol. The reactant mixture was stirred for 5 minutes at 90° C. and cooled to 40° C. to 50° C. The resulting product containing 17% by weight solids based on polyamide amide-acid content was a clear, viscous solution. Films were cast from the solution on aluminum and cured for 10 minutes in an air oven at 220° C. These materials were flexible, a 5-mil thick film being bent upon itself without cracking and the film adhered tenaciously to the aluminum. Complete ring closure of the polyamide amide-acid to the polyamide-imide form was accomplished by an additional cure of five minutes at 300° C., the resulting films exhibiting good flexibility and adherent qualities.

The polyamide amide-acid of this example was also isolated by precipitation from methanol, washed twice with methanol and dried in vacuo for 15 hours. The resulting cream colored solid had an inherent viscosity of 0.67 as measured at a concentration of 0.5% in N-methyl-2-pyrrolidone.

Example 2

Example 1 was repeated on a larger scale to produce a polyamide amide-acid solution containing 17.8% solids. This solution in cresol was coated on a 0.0403" diameter copper wire in a vertical wire tower using conventional wire enameling techniques. The film build of the polymer was 2.2 mils. The coating was then tested in accordance with various tests set forth in Patent 2,936,296. The flexibility after 25% elongation was 1X and the sudden stretch was satisfactory. The cut-through using crossed wires was about 384° C., the resistance to mineral transformer oil was excellent as was the resistance to Askarel transformer fluid. The 60-cycle dielectric strength at 105° C. was 3700 volts per mil. The 60 cycle dissipation factor at 120° C. was 1.9%, at 140° C.—2.0%, at 160° C.—2.2%, at 180° C.—2.4%, at 200° C.—3.9%, at 220° C.—13.5%, and at 240° C.—33%.

The single scrape abrasion using a 1000 g. load was 1270 and the repeated scrape abrasion using a 700 g. load was about 29.

Example 3

This example illustrates the separate preparation of the polyamide-diamine intermediate of the invention. Example 1 was repeated using 216.3 g. (1.09 moles) of p,p'-diaminodiphenyl methane, 103.6 g. (0.545 mole) of azelaic acid and 312 g. of cresol. The reaction was run for about 4½ hours at a temperature ranging from about 220° C. to 225° C., about 18.8 g. of water being isolated. The reaction mixture was then diluted with 780 g. of cresol and cooled to room temperature. After standing for about one day, the product precipitated into a viscous suspension. The polyamidediamine was stored in this condition for a number of weeks with no apparent effect on the quality of the product which was prepared for further use by simply stirring and heating to about 80° C.

Example 4

Example 1 was repeated using 23.5 g. (0.119 mole) p,p'-diaminodiphenyl methane, 8.66 g. (0.0593 mole) adipic acid and 31 g. of cresol, the reaction being carried out for about 7 hours at about 215° C. The reaction mixture was then diluted with 62 g. of cresol, the temperature reduced to about 180° C. and a solution of 18.4 g. (0.0571 mole) of benzophenone dianhydride in 108 g. of cresol was quickly added and the reaction mixture cooled as rapidly as possible to 50° C., such cooling taking about 15 minutes. The polyamide amide-acid solution product resulting was a clear, viscous solution which formed excellent films on glass and aluminum foil which could be bent 180° without cracking. The solution was also dip coated onto a copper surface and cured for 10 minutes at 220° C. and 5 minutes at 300° C. The 60-cycle dissipation factor of the coating so obtained was 5% at 120° C., 6.5% at 140° C., 6.5% at 160° C., 7.0% at 180° C., 8.5% at 200° C., 10.5% at 220° C., and 21% at 240° C.

Example 5

Using the equipment similar to that of Example 1, 22.3 g. (0.113 mole) of p,p'-diaminodiphenyl methane, 9.84 g. (0.0565 mole) suberic acid and 31 g. of cresol were reacted for 8 hours at 230° C. Cresol in the amount of 62 g. was added to the reactant mixture which was cooled to 140° C. At this point, 17.5 g. (0.0543 mole) of benzophenone dianhydride in 104 g. of cresol was added and reaction permitted for about 2 to 3 minutes. The mixture was then cooled as quickly as possible to 40° C. to provide a clear, viscous solution. Films of this material cast on glass and aluminum and cured for about 10 minutes at 220° C. were tough and flexible.

Example 6

Using the equipment similar to that of Example 1, 21.2 g. of p,p'-diaminodiphenyl methane (0.107 mole), 10.90 g. (0.0538 mole) sebacic acid and 31 g. of cersol were reacted for about 7 hours at 215° C. The mixture was then diluted with 62 g. of cresol and cooled to 120° C. At this point 16.60 g. (0.051 mole) of benzophenone dianhydride in 100 g. of cresol was added and allowed to react for 3 minutes with subsequent cooling to 50° C. From the resultant clear, viscous solution, tough and flexible films were formed on glass and aluminum, such films being cured for about 10 minutes at 220° C.

Example 7

Example 1 was repeated using 20.17 g. (0.102 mole) p,p′-diaminodiphenyl methane, 11.87 g. (0.0515 mole) dodecanedioic acid and 31 g. of cresol, the reaction being run for about 7 hours at 215° C. The reaction mixture was then diluted with 62 g. of cresol and 15.80 g. (0.0491 mole) of benzophenone dianhydride in 97 g. of cresol added and reacted for 10 minutes at 100° C. with subsequent cooling to 40° C. A dark orange, clear, viscous solution resulted from which films were cast on aluminum and glass and cured for 10 minutes at 220° C. to a tough, flexible state.

Example 8

There were reacted together in the manner of Example 1, 19.87 g. (0.100 mole) p,p′-diaminodiphenyl methane, 12.57 g. (0.0661 mole) azelaic acid and 31 g. of cresol for 7 hours at 215° C. The resultant mixture was diluted with 62 g. of dry cresol and 10.37 g. (0.0322 mole) of benzophenone dianhydride dissolved and 75 g. of cresol added and reacted for 10 minutes at 100° C. Films 4 mils thick cast from the clear, viscous solution on aluminum and cured at 220° C. for 10 minutes were tough and flexible.

Example 9

There were reacted in the manner of Example 1 19.06 g. (0.0962 mole) p,p′-diaminodiphenyl methane, 13.57 g. (0.0714 mole) of azelaic acid and 31 g. of cresol for about 7 hours at 215° C. The reactant mixture was diluted with 62 g. of cresol and 7.68 g. (0.238 mole) of benzophenone dianhydride dissolved in 60 g. of cresol added and reacted for 10 minutes at 100° C. Films prepared as in the preceding example were tough and flexible.

Example 10

There was placed in a reaction flask equipped with stirrer and heating mantle and protected from atmospheric moisture 7.13 g. (0.0222 mole) of benzophenone dianhydride dissolved in 54.5 g. of cresol. To this solution there was added at 50° C. with stirring 24.6 g. of the polyamide-diamine suspension of Example 3 containing 6.10 g. (0.0111 mole) of active diamine. The reaction mixture was heated at 80° C. for 5 minutes and 2.13 g. (0.0108 mole) of solid p,p′-diaminodiphenyl methane added, the mixture being heated to 110° C. to dissolve all ingredients and then cooled in an ice water bath to 50° C. The resulting product was a clear and viscous solution from which films were cast on aluminum foil and cured for 10 minutes at 220° C. to provide a tough and flexible material. This solution was also dip coated onto a copper surface and cured for 10 minutes at 220° C. and 5 minutes at 300° C. The 60-cycle dissipation factor of the film was 1.9% at 120° C., 2.8% at 140° C., 3.5% at 160° C., 3.8% at 180° C., 4.0% at 200° C., 5.0% at 220° C., 9.0% at 240° C. and 18.0% at 250° C.

Example 11

There were reacted for 4 hours at 225° C. in the manner of Example 1 6.71 g. (0.0339 mole) p,p′-diaminodiphenyl methane, 3.96 g. (0.0172 mole) of dodecanedioic acid and 10 g. of cresol. The reaction mixture was diluted with 25 g. of cresol and cooled to 100° C. after which 3.58 g. (0.0164 mole) of pyromellitic dianhydride dissolved in 112 g. of cresol was added and reacted for 5 minutes at 100° C. The product was a very viscous solution and films cast from the solution cured at 220° C. for 10 minutes and 300° C. for 5 minutes were flexible and appeared to have excellent thermal stability.

Example 12

The intermediate polyamide-diamine suspension of Example 3 in the amount of 2.24 g. and containing 0.56 g. of active diamine (0.00102 mole) was reacted with 0.216 g. (0.000671 mole) of benzophenone dianhydride dissolved in 3.3 g. of cresol for 5 minutes at 90° C. To this solution there was added 0.0737 g. (0.000338 mole) of pyromellitic dianhydride followed by reaction for 5 minutes at 90° C. The reaction mixture was cooled to 40° C. Films cast from this solution and cured at 220° C. for 10 minutes and 300° C. for 5 minutes were tough and flexible and had good thermal stability.

Example 13

The polyamide-diamine suspension of Example 3 in the amount of 2.90 g. containing 0.72 g. (0.0013 mole) of active diamine was reacted with 0.21 g. (0.00065 mole) of benzophenone dianhydride dissolved in 4 g. of cresol for 5 minutes at 90° C. To this reactant mixture there was added 0.14 g. (0.00064 mole) of pyromellitic dianhydride with further reaction for 5 minutes at 90° C. Films cast from the cooled solution and cured at 220° C. for 5 minutes were flexible and had excellent thermal stability.

Example 14

There were reacted together 5.32 g. (0.0492 mole) of m-phenylenediamine, 4.68 g. (0.0247 mole) of azelaic acid and 10 g. of cresol for 2 hours at 215° C. The resulting mixture was diluted with 25 g. of cresol and cooled to 90° C. At this point, 7.92 g. (0.0246 mole) of benzophenone dianhydride dissolved in 52 g. of cresol was added and reacted for 5 minutes with subsequent cooling to 40° C.

The 60-cycle dissipation factors of the present materials were compared with films from other well known commercial compositions prepared by dip coating solutions of the material on copper and curing for 10 minutes at 220° C. and for 5 minutes at 300° C., except where otherwise noted, with the results shown in the table below.

TABLE

| Temp., °C. | Ex. 2 | Ex. 4 | Ex. 10 | Nylon [1] 6-6 | Polyvinyl [2] acetal | Polyimide of pyromellitic dianhydride and oxydianiline | Polyamide-imide |
|---|---|---|---|---|---|---|---|
| 30 | | | | 2 | | | |
| 40 | | | | 5 | | | |
| 50 | | | | 14 | | | |
| 60 | | | | 39 | | | |
| 64 | | | | 50 | | | |
| 120 | 1.9 | 5.0 | 1.9 | | | | |
| 140 | 2.0 | 6.5 | 2.8 | | 2 | 1.9 | 7 |
| 160 | 2.2 | 6.5 | 3.5 | | 15 | 2.5 | 10 |
| 170 | | | | | 38 | | |
| 180 | 2.4 | 7.0 | 3.8 | | | 4.5 | 18 |
| 200 | 3.9 | 8.5 | 4.0 | | | 32.0 | 41 |
| 205 | | | | | | 46.0 | |
| 210 | | | | | | | |
| 220 | 13.5 | 10.5 | 5.0 | | | | |
| 240 | 33.0 | 21.0 | 9.0 | | | | |
| 250 | | | 18.0 | | | | |

[1] Sample prepared by compression molding at 275° and 10,000 p.s.i.
[2] Cured for 10 minutes at 220°

From the above it will be apparent that not only are the physical characteristics of the present materials very desirable but their electrical characteristics excellent.

There are provided, then, by this invention new and useful polyamide-diamines and polyamide amide-acids and polyamide-imides prepared from such diamines which are possessed of desirable physical characteristics including high cut-through. They are furthermore simply prepared using inexpensive solvents such as cresol. They are possessed of good electricals including low dissipation factor and high dielectric strength. They are readily formed from solution into films and coatings which are tough, flexible and abrasion-resistant. They are furthermore resistant to chemicals such as mineral oil, halogenated diphenyl materials, and the like.

What we claim as new and desire to secure by Letters Patent of the United States is:

1. A polyamide-diamine consisting of the formula (III)

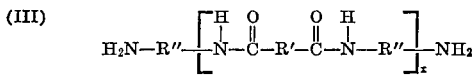

where R' is selected from saturated and unsaturated straight chain hydrocarbon radicals, R" is a divalent aromatic group wherein the free valences are on different carbon atoms and $x$ is from about 1 to 3.

2. A polyamide amide-acid comprising the reaction product of (1) at least one dianhydride having the formula (IV)

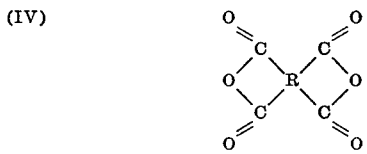

where R is a tetravalent organic radical containing at least two carbon atoms, (2) at least one diamine having the formula (II)          $H_2N-R''-NH_2$ where R" is a divalent aromatic group and (3) at least one polyamide-diamine as in claim 1, the dianhydride and diamine being in essentially equimolar amounts.

3. A composition as in claim 2 wherein said dianhydride is benzophenone dianhydride, said polyamide-diamine is derived from methylene dianiline and azelaic acid and said diamine is methylene dianiline.

4. A polyamide amide-acid consisting of the general formula

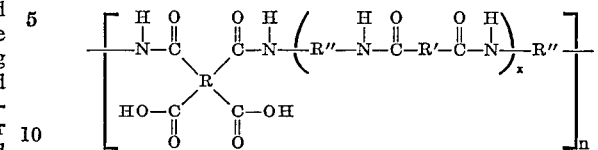

where R is a tetravalent organic radical containing at least two carbon atoms, R' is selected from saturated and unsaturated straight chain hydrocarbon radicals and R" is a divalent aromatic group wherein the free valences are on different carbon atoms, $n$ is at least 2 and $x$ is from about 1 to 3.

5. A polyamide-imide consisting of the formula

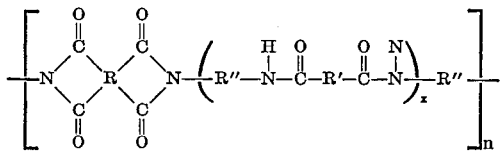

where R is a tetravalent organic radical containing at least two carbon atoms, R' is selected from saturated and unsaturated straight chain hydrocarbon radicals and mixtures thereof, R" is a divalent aromatic group wherein the free valences are on different carbon atoms, $n$ is at least two and $x$ is from about 1 to 3.

References Cited

UNITED STATES PATENTS

| | | | |
|---|---|---|---|
| 2,244,192 | 6/1941 | Flory | 260—78 |
| 3,049,518 | 8/1962 | Stephens | 260—78 |
| 3,068,188 | 12/1962 | Beste et al. | 260—30.2 |
| 3,179,631 | 4/1965 | Endrey | 260—78 |

WILLIAM H. SHORT, Primary Examiner

L. L. LEE, Assistant Examiner

U.S. Cl. X.R.

260—47, 78, 561

PO-1050
(5/69)

UNITED STATES PATENT OFFICE
CERTIFICATE OF CORRECTION

Patent No. 3,471,444      Dated October 7, 1969

Inventor(s) Thomas L. Sherer and Ralph G. Flowers

It is certified that error appears in the above-identified patent and that said Letters Patent are hereby corrected as shown below:

| | |
|---|---|
| Column 1, line 55 | before "polyamide" insert - to - |
| Column 1, line 56 | after "amide" - delete -to - |
| Column 4, line 69 | "Cresol" is misspelled |
| Column 5, line 33 | "(0.238)" should be - (0.0238) |

SIGNED AND
SEALED
MAY 12 1970

(SEAL)
Attest:

Edward M. Fletcher, Jr.
Attesting Officer

WILLIAM E. SCHUYLER, JR.
Commissioner of Patents